United States Patent
Kunori

(10) Patent No.: US 10,101,698 B2
(45) Date of Patent: Oct. 16, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shiro Kunori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 14/956,208

(22) Filed: Dec. 1, 2015

(65) Prior Publication Data
US 2016/0162107 A1    Jun. 9, 2016

(30) Foreign Application Priority Data

Dec. 4, 2014   (JP) .................................. 2014-246336

(51) Int. Cl.
| G03G 15/00 | (2006.01) |
| G06F 3/0488 | (2013.01) |
| G06F 3/038 | (2013.01) |
| G06F 3/044 | (2006.01) |
| G06F 3/0484 | (2013.01) |

(52) U.S. Cl.
CPC ......... G03G 15/5016 (2013.01); G06F 3/038 (2013.01); G06F 3/044 (2013.01); G06F 3/0484 (2013.01); G06F 3/0488 (2013.01); G06F 2203/04104 (2013.01); G06F 2203/04808 (2013.01)

(58) Field of Classification Search
CPC ............................ G06F 3/0416; G06F 3/0412
See application file for complete search history.

(56) References Cited

U.S. PATENT DOCUMENTS

| 8,560,975 B2* | 10/2013 | Beaver .................. G06F 3/0488 345/156 |
| 2010/0146458 A1* | 6/2010 | Wadekar ................. G06F 3/038 715/863 |
| 2013/0038552 A1* | 2/2013 | Chan ................... G06F 3/04883 345/173 |
| 2014/0160054 A1* | 6/2014 | Rabii .................... G06F 3/0488 345/174 |

FOREIGN PATENT DOCUMENTS

| JP | 2006-026167 A | 2/2006 |
| JP | 2011-034511 A | 2/2011 |
| JP | 2012-181806 A | 9/2012 |
| JP | 2014063515 A | 4/2014 |

* cited by examiner

*Primary Examiner* — Amare Mengistu
*Assistant Examiner* — Shawna Stepp Jones
(74) *Attorney, Agent, or Firm* — Canon U.S.A., Inc. IP Division

(57) ABSTRACT

An information processing apparatus having a touch panel capable of detecting multi-touch operations detects a touch event based on an operation by a user on the touch panel, and generates a single touch event based on a detected multi-touch event. Then, the information processing apparatus transmits the generated single touch event to an application not supporting multi-touch events. Thus, conventional operabilities can be maintained even in a case where an application not supporting multi-touch events is operated.

14 Claims, 12 Drawing Sheets

FIG. 4

| EVENT ID | TOUCH COUNT | EVENT TYPE | COORDINATES |
|---|---|---|---|
| 1 | 1 | SINGLE PRESS | (200, 200) |
| 2 | 1 | SINGLE MOVE | (200, 225) |
| 3 | 1 | SINGLE MOVE | (200, 250) |
| 4 | 1 | SINGLE MOVE | (200, 275) |
| 5 | 1 | SINGLE RELEASE | (200, 300) |

FIG. 5

| EVENT ID | TOUCH COUNT | EVENT TYPE | COORDINATES |
|---|---|---|---|
| 1 | 2 | MULTI-PRESS | (200, 200), (210, 200) |
| 2 | 2 | MULTI-MOVE | (200, 225), (210, 225) |
| 3 | 2 | MULTI-MOVE | (200, 250), (210, 250) |
| 4 | 2 | MULTI-MOVE | (200, 275), (210, 275) |
| 5 | 2 | MULTI-RELEASE | (200, 300), (210, 300) |

FIG. 9

| APPLICATION | MULTI-TOUCH FLAG |
|---|---|
| COPY | 0 |
| SEND | 0 |
| BOX | 1 |

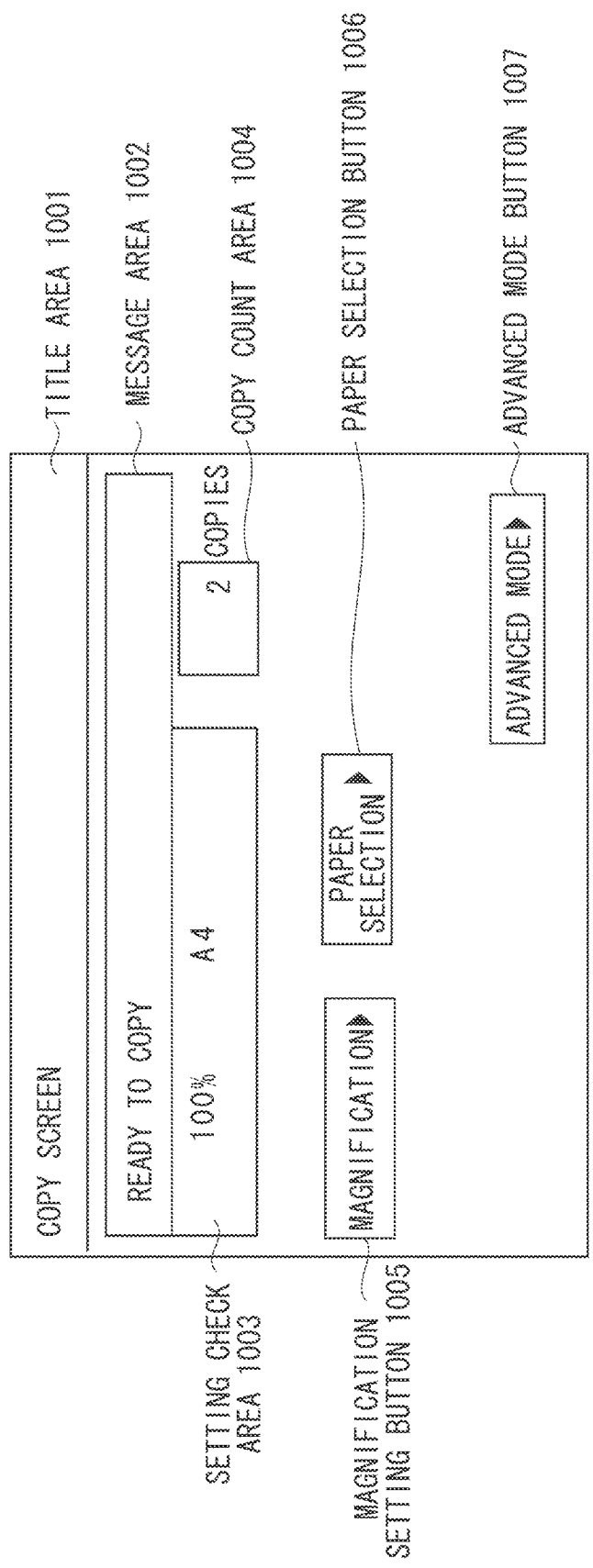

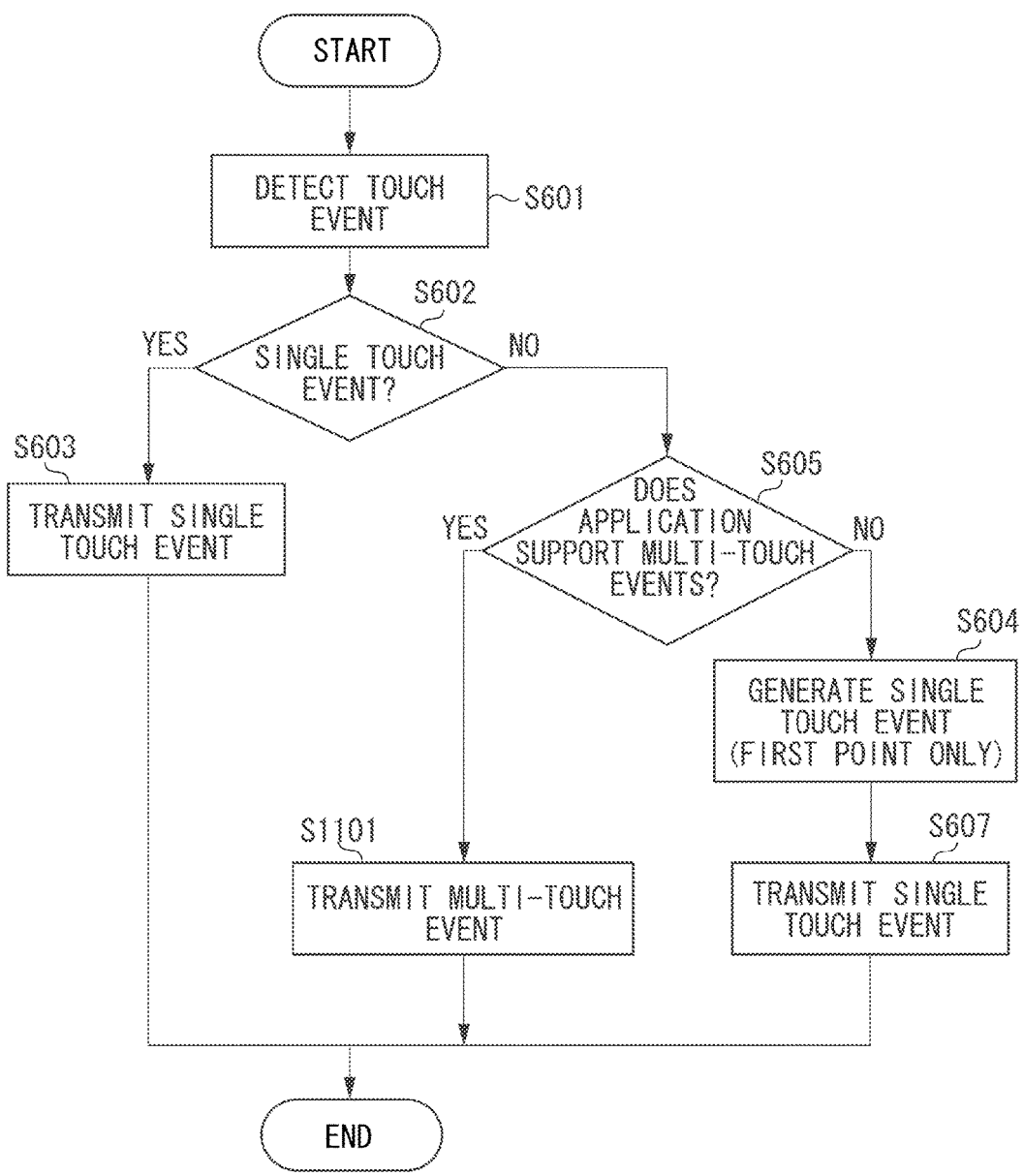

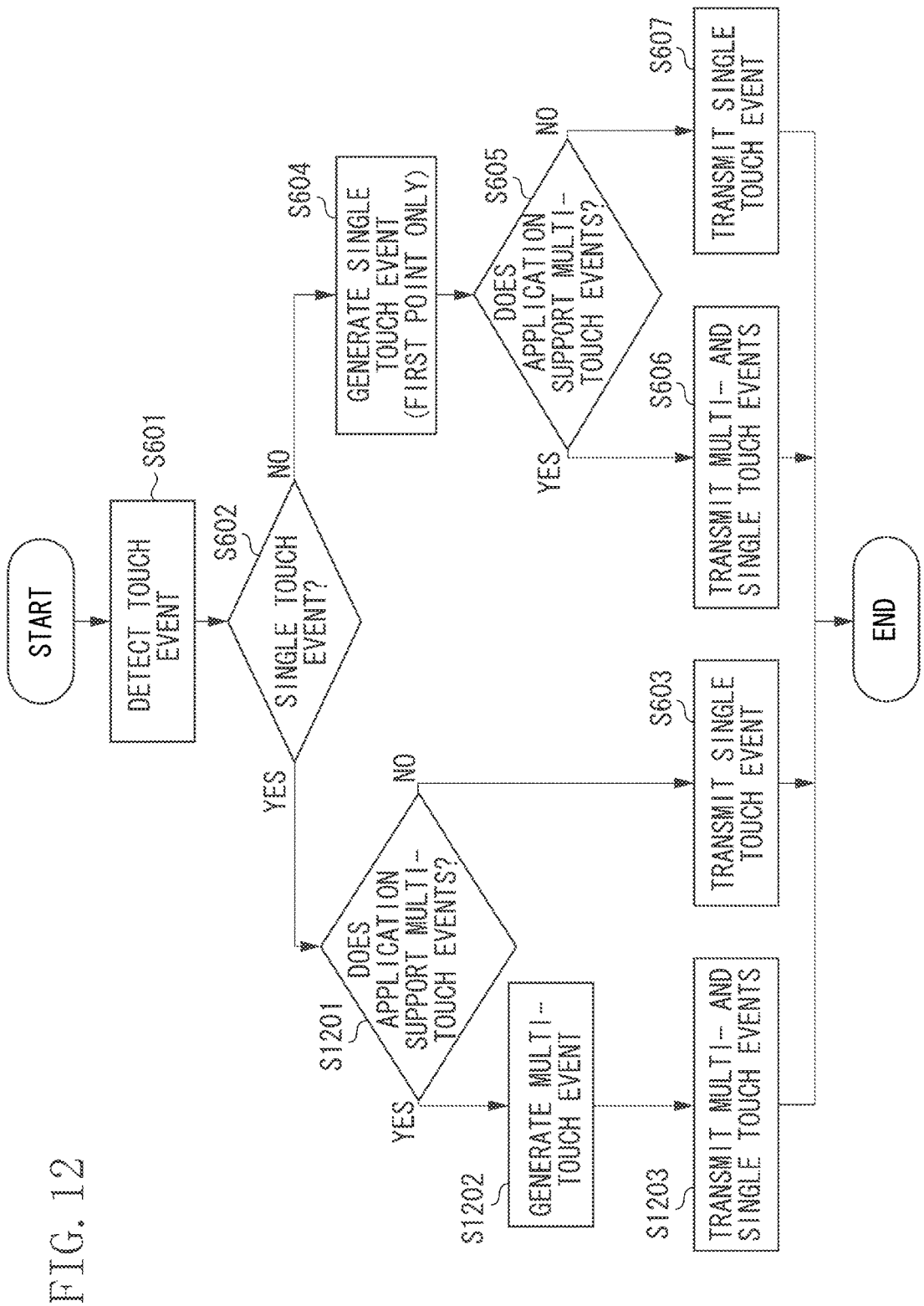

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to an information processing apparatus having a touch panel capable of detecting a multi-touch operation, an information processing method in the information processing apparatus, and a storage medium.

Description of the Related Art

In recent years, an information processing apparatus having a touch panel capable of detecting a multi-touch operation to enable an intuitive operation by a user has been widely used. A multi-touch operation performed on this touch panel includes a pinch-in and a pinch-out.

An electrostatic touch panel is widely known as a touch panel capable of detecting a multi-touch operation. A conventional resistance film type (pressure-sensitive type) touch panel capable of detecting only one point (single touch) even when the user touches a plurality of points at the same time. On the other hand, an electrostatic touch panel is capable of detecting a plurality of points touched at the same time by the user.

To achieve a multi-touch operation, it is necessary not only to employ a touch panel capable of detecting a multi-touch operation (hereinafter referred to as a new touch panel) but also to implement a support of a multi-touch event by an application operating on an information processing apparatus. More specifically, even if an application developed for a touch panel (hereinafter referred to as a conventional touch panel) capable of detecting only a single touch operation (hereinafter referred to as a conventional application) is installed on an information processing apparatus having a new touch panel, the application does not support a multi-touch operation unless the implementation of the application is modified. This is because, even if a multi-touch event detected by a new touch panel is transmitted to a conventional application not supporting a multi-touch event, the conventional application is unable to identify the event. Further, since a multi-touch event transmission to a conventional application not supporting a multi-touch event is a useless event transmission, the multi-touch event transmission may affect the performance of the entire information processing apparatus.

Japanese Patent Application Laid-Open No. 2014-63515 discusses a technique in which a flag for determining whether to transmit a multi-touch event is prepared and, when this flag is OFF, a multi-touch event detected by a touch panel is not transmitted to an application.

In the technique discussed in Japanese Patent Application Laid-Open No. 2014-63515, even if a user performs a multi-touch operation on a new touch panel capable of detecting a multi-touch operation, the event is not transmitted to a conventional application not supporting a multi-touch event. Therefore, it is possible to prevent performance degradation in an information processing apparatus due to a transmission of an event which cannot be identified by the conventional application. On the other hand, operating a conventional application on a new touch panel may cause the following problem.

A specific example will be described below. Generally, when performing an operation for selecting a virtual button (hereinafter referred to as a button) displayed on a touch panel, a user touches the button with one finger. The touch panel detects the operation as a single touch event, and notifies the conventional application of the event. The conventional application performs a predetermined operation based on the single touch event.

On the other hand, some elderly persons touch a button with two fingers, not with one finger. Such an elderly person may touch a button with two fingers such as the index and the middle fingers in contact with each other. In this case, even when the user touches a resistance film type touch panel with a plurality of fingers at the same time, it detects only one point as a single touch event, as described above. More specifically, the resistance film type touch panel detects a single touch event based on the coordinates of the middle point between the two touched points. As a result, the conventional application is notified of the single touch event, and is able to perform a predetermined operation based on the single touch event.

On the other hand, when the user performs the same operation (an operation for selecting a button with two fingers) on a new touch panel, the new touch panel detects the operation as a multi-touch event, not as a single touch event. Therefore, the conventional application does not perform an operation based on the user operation.

More specifically, if a conventional application is installed on an information processing apparatus having a new touch panel, there may arise a situation where the conventional application does not operate even if the user performs the same operation as a conventional one. This situation may arise, for example, when the user replaces an information processing apparatus having a conventional touch panel with an information processing apparatus having a new touch panel. This situation may be a major problem in an image forming apparatus having a scanner function, a print function, etc., since importance is attached to enabling applications to operate on any hardware component without modifying applications.

SUMMARY OF THE INVENTION

The present disclosure is directed to maintaining conventional operabilities even in a case where an application not supporting a multi-touch event is operated on an information processing apparatus having a touch panel capable of detecting a multi-touch operation.

According to an aspect of the present disclosure, an information processing apparatus having a touch panel capable of detecting multi-touch operations includes a detection unit configured to detect a touch event based on an operation by a user on the touch panel, a generation unit configured to generate a single touch event based on a multi-touch event detected by the detection unit, and a transmission unit configured to transmit the single touch event generated by the generation unit to an application not supporting multi-touch events.

Further features of the present disclosure will become apparent from the following description of exemplary embodiments with reference to the attached drawings.

BRIEF DESCRIPTION OF THE DRAWINGS

FIG. 4 illustrates an example of a single touch event occurring when a user performs a single touch operation on the operation unit of the image forming apparatus.

FIG. 5 illustrates an example of a multi-touch event occurring when the user performs a multi-touch operation on the operation unit of the image forming apparatus.

FIG. 9 illustrates an image of a multi-touch management table stored in a hard disk drive (HDD) according to each exemplary embodiment of the present disclosure.

FIG. 10 illustrates an example of a screen displayed on the operation unit of the image forming apparatus.

FIG. 11 is a flowchart illustrating processing of a software module according to a second exemplary embodiment of the present disclosure.

FIG. 12 is a flowchart illustrating processing of a software module according to a third exemplary embodiment of the present disclosure.

DESCRIPTION OF THE EMBODIMENTS

Exemplary embodiments of the present invention will be described below with reference to the accompanying drawings.

Figure 1:
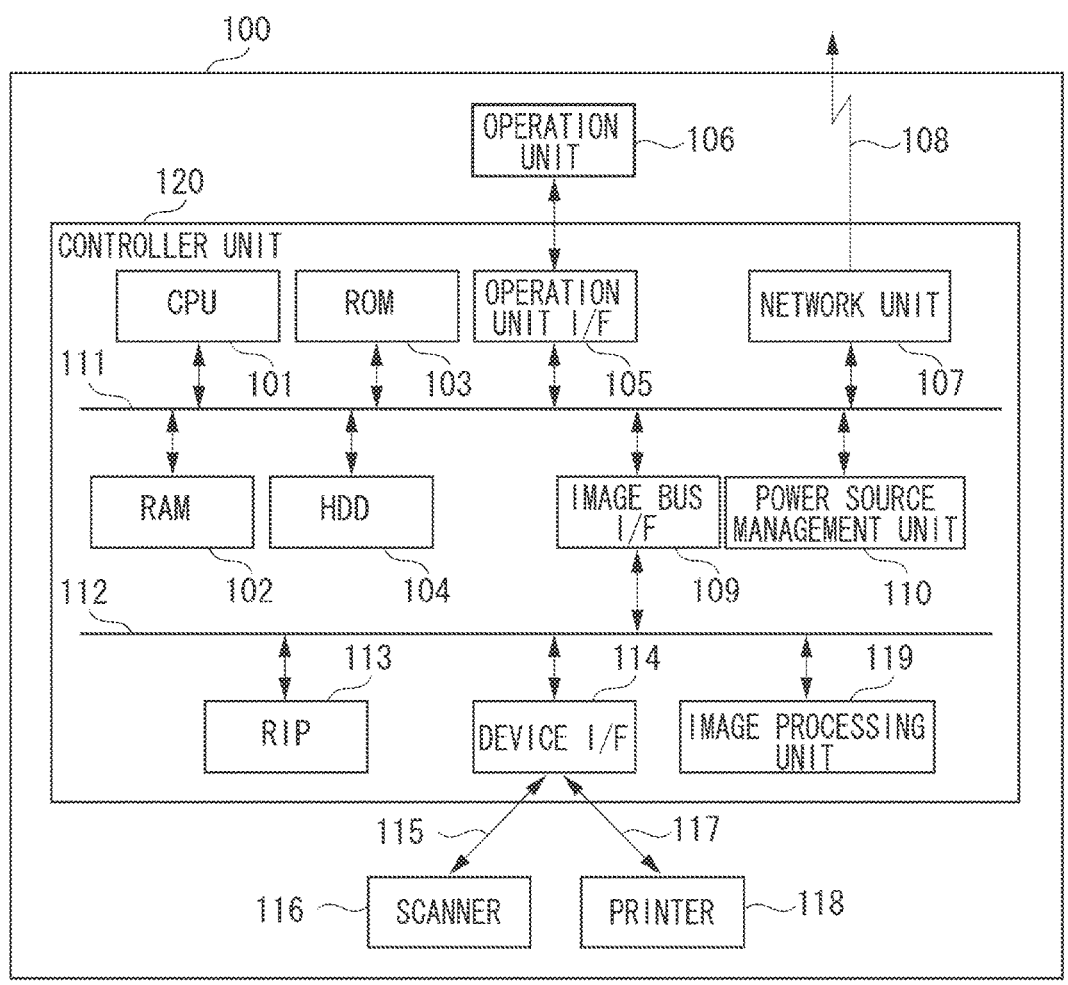
FIG. 1 is a block diagram illustrating a configuration of a controller unit of an image forming apparatus according to each exemplary embodiment of the present disclosure.

FIG. 1 is a block diagram illustrating a configuration of a controller unit of an image forming apparatus 100 according to each exemplary embodiment of the present disclosure. As used herein, the term "unit" generally refers to any combination of software, firmware, hardware, or other component, such as circuitry, that is used to effectuate a purpose.

A controller unit 120 includes a central processing unit (CPU) 101 which executes various control programs.

The CPU 101 activates a system based on a boot program stored in a read only memory (ROM) 103, reads a control program stored in a hard disk drive (HDD) 104 on the system, and executes predetermined processing by using a random access memory (RAM) 102 as a work area. This control program enables executing a predetermined control program such as a Java® program. The HDD 104 stores not only above-described various control programs but also image data and information about all of communication units included in a network unit 107 (described below).

The RAM 102, the ROM 103, and the HDD 104 are connected to the CPU 101 via a system bus 111. Further, an operation unit interface (I/F) 105, a network unit 107, an image bus I/F 109, and a power source management unit 110 are connected to the CPU 101 via the system bus 111.

The operation unit I/F 105, which is an interface unit for interfacing the operation unit 106, performs processing for acquiring from the RAM 102 image data to be displayed on the operation unit 106 and transferring the image data, and performs processing for transferring a signal generated in the operation unit 106 to the CPU 101.

The operation unit 106 performs display processing for displaying an operation target such as an image which can be operated by the user, and input processing for detecting a signal (input signal) based on a user's operation.

The power source management unit 110 manages the turning of power of the image forming apparatus 100 ON and OFF. When power is detected to be ON, the CPU 101 activates the system based on the boot program in the ROM 103, and executes on this system a control program stored in the HDD 104, as described above.

The network unit 107 is connected to a local area network (LAN) 108 to input and output information via the LAN 108. When a web server or an external apparatus is connected to the LAN 108, the network unit 107 is able to acquire information from the web server via the LAN 108. The network unit 107 is also able to access the Internet via a proxy server in the LAN 108 to acquire web contents from a web server on the Internet.

An image bus I/F 109 is a bus bridge for connecting the system bus 111 and an image bus 112, and for converting data structures. The image bus 112 is composed of a Peripheral Component Interconnect (PCI) bus or a bus conforming to the Institute of Electrical and Electronics Engineers (IEEE) 1394 standard capable of high speed image data transfer. A raster image processor (RIP) 113, a device I/F 114, and an image processing unit 119 are connected to the image bus 112.

The RIP 113 rasterizes page description language (PDL) codes into a bitmap image.

The device I/F 114 connects a scanner 116 and a printer 118 serving as image input/output devices with the controller unit 120, and executes conversion between synchronous data and asynchronous data. The device I/F 114 and the scanner 116 are connected via a cable 115, and the device I/F 114 and the printer 118 are connected via a cable 117.

The image processing unit 119 performs Joint Photographic Experts Group (JPEG) compression/decompression processing on multi-valued image data, and performs JPEG, Modified Modified READ (MMR), and Modified Huffman (MH) compression/decompression processing on multivalued image data. The image processing unit 119 further performs correction such as printer correction and modification and editing such as resolution conversion on input image data or an output screen.

Thus, the CPU 101 of the controller unit 120 totally controls access with various devices connected to the system bus 111 based on each control program, and, at the same time, reads image information from the scanner 116 via the device I/F 114. After performing predetermined processing on the read image information, for example, the CPU 101 performs control to output the relevant image information to the printer 118 via the device I/F 114. The CPU 101 further performs analysis and conversion processing on text or image data acquired via the network unit 107, and stores the processed data in the HDD 104 or performs control to display the relevant data on the operation unit 106.

Figure 2:
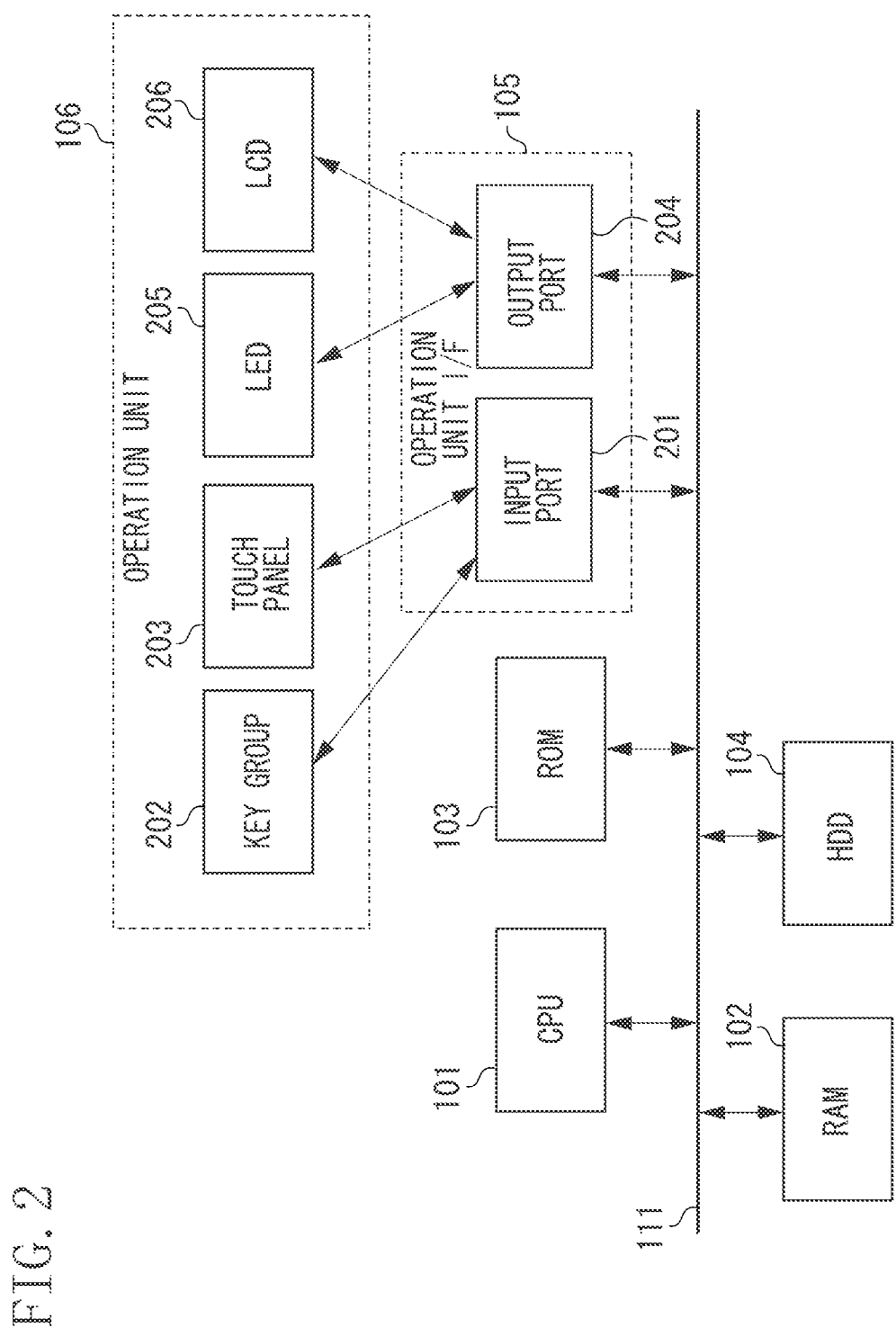
FIG. 2 is a block diagram illustrating an operation unit of the image forming apparatus and a configuration of the vicinity of the operation unit according to each exemplary embodiment of the present disclosure.

FIG. 2 is a block diagram illustrating a configuration of the operation unit 106 and components in the vicinity thereof illustrated in FIG. 1.

A touch panel 203 and a key group 202 of hardware of the operation unit 106 are connected to the CPU 101 via an input port 201 of the operation unit I/F 105. Further, positional information (coordinates) indicating a depression position of the touch panel 203 and key information corresponding to the depression of the key group 202 are input to the CPU 101 via the input port 201.

A light emitting diode (LED) 205 and a liquid crystal display (LCD) 206 of the operation unit 106 are connected to the CPU 101 via an output port 204 of the operation unit I/F 105. The lighting of the LED 205 and the display of the LCD 206 are controlled by the CPU 101. The touch panel 203 has a very small amount of a current flow, and uses a electrostatic method for electrostatically detecting a touch position based on electric quantity changes occurring when the user touches the touch panel 203. Thus, the touch panel 203 is capable of detecting multi-touch operations. The touch panel 203 is arranged so as to be stacked on the LCD 206. When the user touches an operation target such as a virtual button (hereinafter referred to as a button) displayed on the LCD 206, the touch panel 203 detects relevant positional information (coordinates). Upon detection of the position information, the CPU 101 detects what operation target has been selected by the user based on the operation target currently displayed on the LCD 206 and its coordinates. Then, the CPU 101 detects an instruction to be executed when the detected operation target is selected out of instructions pre-stored in the ROM 103 or the HDD 104, and executes the relevant instruction. Accordingly, screen data to be displayed on the LCD 206 is generated. When the CPU 101 transmits the screen data to the LCD 206 via the output port 204, the display of the operation unit 106 can be changed. Internal processing performed when the user performs an operation on the LCD 206 is common to all of subsequent descriptions, and descriptions thereof will be omitted.

Figure 3:
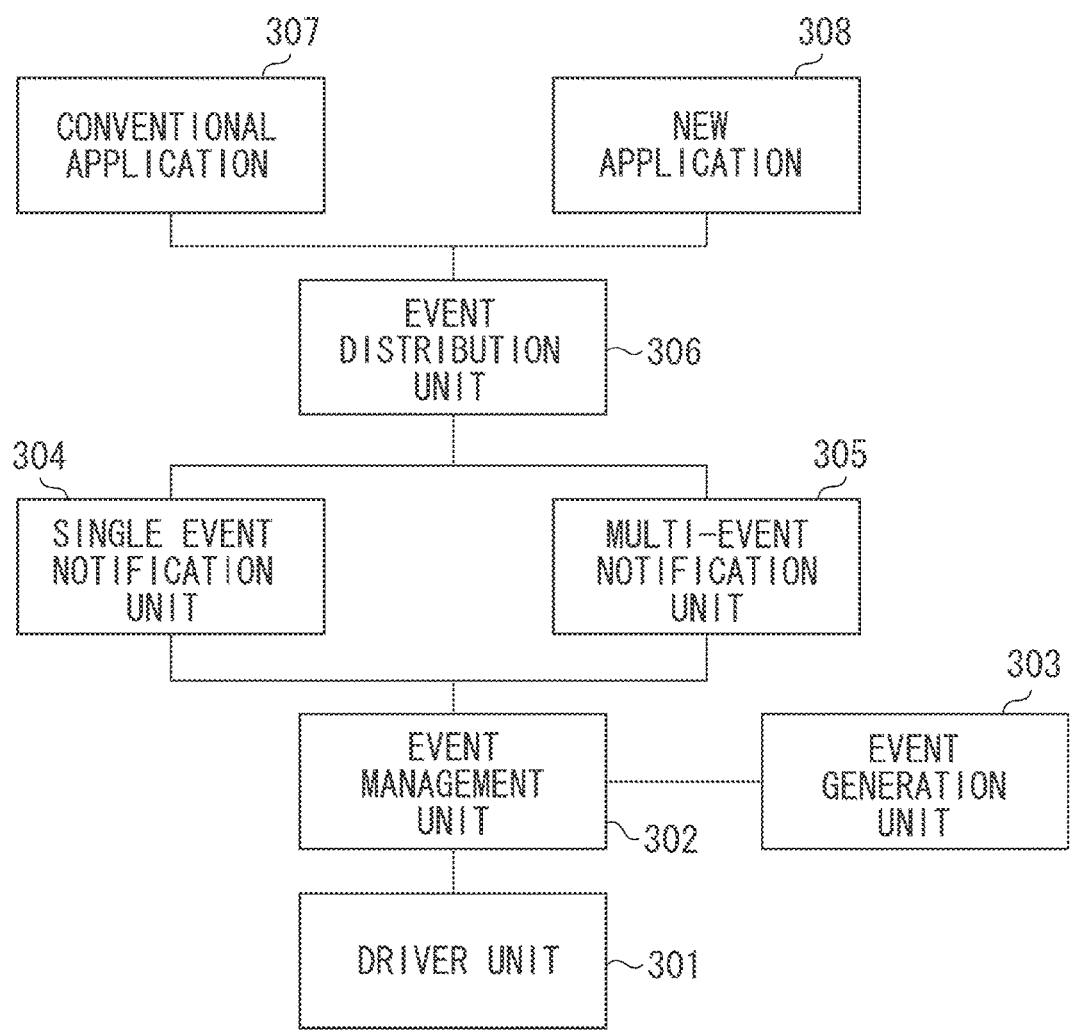
FIG. 3 illustrates a software module configuration according to each exemplary embodiment of the present disclosure.

A configuration of software modules operating on each hardware component of the image forming apparatus 100, such as the CPU 101 and the HDD 104, will be described below with reference to FIG. 3. Processing in each of these modules is implemented when an instruction for the CPU 101 reads a program stored in the ROM 103 or the HDD 104, and then performs predetermined processing by using the RAM 102 as a work area. All of information generated by performing the predetermined processing is stored in the RAM 102 or the HDD 104. Unless otherwise specifically noted, processing in each module is similar, and descriptions of such hardware components will be omitted.

A driver unit 301 is a module for detecting a touch event (a press, a release, a move, etc.) occurring based on a touch operation on the touch panel 203 by the user. A press is an event occurring when a finger touches the touch panel 203. A release is an event occurring when a finger in contact with the touch panel 203 is detached from the touch panel 203. A move is an event occurring when a finger is moving while in contact with the touch panel 203.

The driver unit 301 transmits a detected touch event to an event management unit 302. The touch event transmitted in this case includes the number of touches (touch count), an event type, and touch coordinates. For example, it is assumed that the user touches the point of coordinates (200, 200) on the touch panel 203 with a finger, moves the finger to the point of coordinates (200, 300), and then detaches the finger from the touch panel 203 (the finger has moved downward by a distance of coordinates 100). Events detected by the driver unit 301 and then transmitted to the event management unit 302 in this case are illustrated in FIG. 4. FIG. 4 illustrates that five events (from event identifier (ID) 1 to event ID 5) have occurred since the time when the user touches the touch panel 203 with the finger till the time when the user detaches the finger from the touch panel 203. The driver unit 301 sequentially transmits these events to the event management unit 302.

As another example, it is assumed that the user touches the points of coordinates (200, 200) and coordinates (210, 200) on the touch panel 203 with different fingers, moves these fingers to the points of coordinates (200, 300) and coordinates (210, 300) respectively, and then detaches the fingers from the touch panel 203. Events detected by the driver unit 301 and then transmitted to the event management unit 302 in this case are illustrated in FIG. 5. The event IDs illustrated in FIGS. 4 and 5 are used to uniquely identify each event and are not actually transmitted. Events having an event type of a single press, a single move, and a single release are collectively referred to as single touch events. Events having an event type of a multi-press, a multi-move, and a multi-release are collectively referred to as multi-touch events.

The event management unit 302 is a module for receiving an event transmitted from the driver unit 301 or an event generation unit 303 (described below), and for performing different processing according to the event type of the received event. When the event type of the event received from the driver unit 301 or the event generation unit 303 is a single touch event, the event management unit 302 transmits the received single touch event to a single event notification unit 304. On the other hand, when the event type of the received event is a multi-touch event, the event management unit 302 transmits the received multi-touch event to a multi-event notification unit 305. Further, when the event type of the event transmitted from the driver unit 301 is a multi-touch event, the event management unit 302 transmits the event to the event generation unit 303.

The event generation unit 303 is a module for receiving an event transmitted from the event management unit 302, and for generating a dummy event having a different event type from the event type of the received event. For example, when the event generation unit 303 receives a multi-touch event with event ID 1 illustrated in FIG. 5, the event generation unit 303 generates a single touch event including only coordinates of the first point. More specifically, the event generation unit 303 generates the same event (touch count=1, event type=single press, coordinates=(200, 200)) as event ID 1 illustrated in FIG. 4. Hereinafter, an event transmitted from the driver unit 301 to the event management unit 302 is referred to as an original event. An event generated by the event generation unit 303 is referred to as a dummy event. Then, the event generation unit 303 transmits the generated dummy event to the event management unit 302. Upon reception of the dummy event, the event management unit 302 transmits the dummy event to the single event notification unit 304.

The single event notification unit 304 is a module capable of handling only a single touch event. The single event notification unit 304 receives a single touch event from the event management unit 302, and transmits the received single touch event to an event distribution unit 306.

The multi-event notification unit 305 is a module capable of handling only a multi-touch event. The multi-event notification unit 305 receives a multi-touch event from the event management unit 302, and transmits the received multi-touch event to the event distribution unit 306. Each exemplary embodiment of the present invention has a configuration in which the single event notification unit 304 and the multi-event notification unit 305 each transmits an event to the event distribution unit 306, as a separate module. This is because the multi-event notification unit 305 has been added as a new module, without modifying the single event notification unit 304, to the conventional module configuration including only the single event notification unit 304.

The event distribution unit 306 receives an event transmitted from the single event notification unit 304 or the multi-event notification unit 305, and, according to the event type of the received event and the application currently displayed on the LCD 206, transmits the received event to the application. In the present exemplary embodiment, only one application is assumed to be displayed on the LCD 206. More specifically, even when a plurality of applications is activated, there is only one operation target application that is subjected to a user operation, and the event distribution unit 306 transmits an event to the application. When the event type of the received event is a single touch event, the event distribution unit 306 transmits the received event to the application (a conventional application 307 or a new application 308) currently displayed on the LCD 206. On the other hand, when the event type of the received event is a multi-touch event, the event distribution unit 306 checks the application currently displayed on the LCD 206. When the application currently displayed on the LCD 206 is the conventional application 307, the event distribution unit 306 does not transmit the received multi-touch event to the conventional application 307. On the other hand, when the application currently displayed on the LCD 206 is the new application 308, the event distribution unit 306 transmits the received multi-touch event to the new application 308.

The conventional application 307, which is an application capable of handling only a single touch event, receives an event from the event distribution unit 306, and performs processing according to the event.

The new application 308, which is an application capable of handling both single touch and multi-touch events, receives an event from the event distribution unit 306, and performs processing according to the event.

Processing of each software module will be described below with reference to a flowchart illustrated in FIG. 6.

In step S601, when the user performs a touch operation on the touch panel 203, the driver unit 301 detects the touch count, the event type, and the touch coordinates as a touch event. This method for detecting a touch event is similar to a detection method for a general electrostatic touch panel, and detailed descriptions thereof will be omitted. Then, the driver unit 301 transmits the detected touch event to the event management unit 302. In step S602, upon reception of the event, the event management unit 302 determines whether the received event is a single touch event depending on whether the touch count included in the touch event is 1.

First of all, processing performed when the event received by the event management unit 302 is a single touch event will be described below. When the event management unit 302 determines that the received event is a single touch event (YES in step S602), then in step S603, the event management unit 302 transmits the received event to the single event notification unit 304. The single event notification unit 304 transmits the event received from the event management unit 302 to the event distribution unit 306. Then, the event distribution unit 306 transmits the event to the application currently displayed on the LCD 206. Upon reception of the event, the application performs a predetermined operation corresponding to the received event. As described above, when the event received by the event management unit 302 is a single touch event, a single touch event is transmitted to the current operation target application regardless of whether the application is the conventional application 307 or the new application 308.

Next, processing performed when the event received by the event management unit 302 is a multi-touch event will be described below. When the event management unit 302 determines that the received event is a multi-touch event (NO in step S602), then in step S604, the event management unit 302 transmits the received event to the event generation unit 303. The event generation unit 303 generates a single touch event composed of one point based on the received event. The generated single touch event is a dummy event. Then, the event generation unit 303 transmits the generated dummy event to the event management unit 302.

The event management unit 302 transmits the dummy event transmitted from the event generation unit 303 to the single event notification unit 304, and transmits the multi-touch event (original event) transmitted from the driver unit 301 to the multi-event notification unit 305.

Upon reception of the dummy event from the event management unit 302, the single event notification unit 304 notifies the event distribution unit 306 of the received event. Upon reception of the original event from the event management unit 302, the multi-event notification unit 305 notifies the event distribution unit 306 of the received event.

In step S605, upon reception of the event from the single event notification unit 304 or the multi-event notification unit 305, the event distribution unit 306 determines whether the application currently displayed on the LCD 206 is the new application 308 supporting multi-touch events.

A method used by the event distribution unit 306 to determine whether the application currently displayed on the LCD 206 is an application supporting multi-touch events will be described below. The event distribution unit 306 manages information about whether multi-touch operations are possible by using a multi-touch management table for each application (described in details below with reference to FIG. 9). The information about whether multi-touch operations are possible can be changed by each application by issuing a multi-touch request to the event distribution unit 306. More specifically, to change the information, each application issues a multi-touch request to the event distribution unit 306 as initialization processing before receiving a user's operation. The event distribution unit 306 identifies the application currently displayed on the LCD 206, and uses the information managed in the multi-touch management table to enable determining whether the identified application is an application supporting multi-touch events.

When the event distribution unit 306 determines that a new application 308 supporting multi-touch events is currently displayed on the LCD 206 (YES in step S605), then in step S606, the event distribution unit 306 transmits the received dummy and original events to the new application 308. On the other hand, when the event distribution unit 306 determines that the conventional application 307 not supporting multi-touch events is currently displayed on the LCD 206 (NO in step S605), then in step S607, the event distribution unit 306 transmits only the received dummy event to the conventional application 307.

When the event received by the event management unit 302 is a multi-touch event as described above and the current operation target application is the conventional application 307, a single touch event (dummy event) generated based on the multi-touch event is transmitted. Thus, since the conventional application 307 is able to operate based on the received single touch event, it is possible to maintain similar operabilities to conventional operabilities without modifying the conventional application 307. Therefore, the compatibility of applications can be maintained, which means that applications operate on touch panels of any type without modifications of applications.

Processing illustrated in FIG. 6 will be described in detail below with reference to specific examples.

Figure 7:
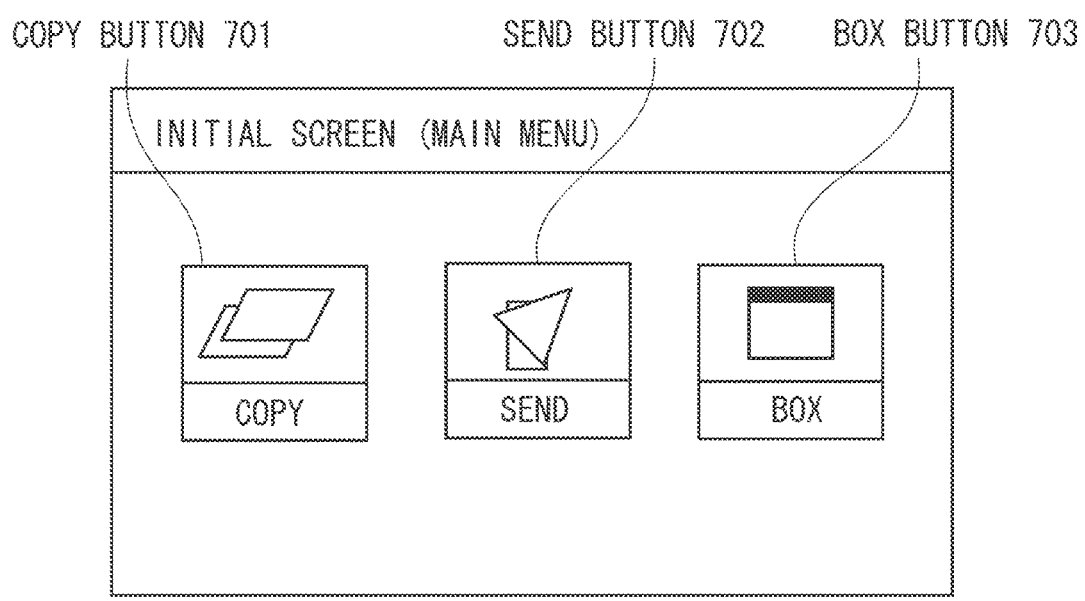
FIG. 7 illustrates an example of a screen displayed on the operation unit of the image forming apparatus.

FIG. 7 illustrates an example of a screen displayed first on the operation unit 106 (the LCD 206) of the image forming apparatus 100 when power of the image forming apparatus 100 is turned ON. In subsequent descriptions, this screen displayed first on the operation unit 106 after turning ON power of the image forming apparatus 100 is referred to as an initial screen. This initial screen is a menu screen used by the user to select a desired application from among applications executable by the image forming apparatus 100.

The initial screen illustrated in FIG. 7 displays a Copy button 701 for accessing a copy application, a Send button 702 for accessing a send application, and a Box button 703 for accessing a box application. Other applications can also be installed on the image forming apparatus 100 in addition to the above-described ones. When another application is installed, a button for calling and executing the application is displayed on the initial screen. When the user touches (presses) a button displayed on the initial screen, processing of the application corresponding to the touched button is executed. In the present exemplary embodiment, only the Copy button 701, the Send button 702, and the Box button 703 are assumed to be displayed on the initial screen. The copy application corresponding to the Copy button 701 and the send application corresponding to the Send button 702 are assumed to be conventional applications 307 capable of processing only single touch events. The box application corresponding to the Box button 703 is assumed to be a new application capable of processing both a single touch and a multi-touch event.

Firstly, a specific example in which the user performs a single touch and a multi-touch operations on the box application (new application 308) in the initial screen will be described below. Secondly, a specific example in which the user performs a single touch and a multi-touch operations on the copy application (conventional application 307) in the initial screen will be described below.

When the user touches (presses) the Box button 703 in the initial screen, the box application corresponding to this button is called and initialization processing for the box application is performed. Then, after completion of the initialization processing, a box application screen (FIG. 8) is displayed. A specific example of the initialization processing will be described below, and then the screen illustrated in FIG. 8 will be described below.

The box application is the new application 308 supporting multi-touch events. In the initialization processing, the box application transmits a multi-touch request to the event distribution unit 306. Upon reception of the multi-touch request, the event distribution unit 306 memorizes that the box application is an application supporting multi-touch events. More specifically, to manage each application displayed on the initial screen in association with the presence or absence of a multi-touch request, the event distribution unit 306 updates the multi-touch management table illustrated in FIG. 9 in response to a multi-touch request from each application.

The multi-touch management table illustrated in FIG. 9 will be described below. A multi-touch flag in this table indicates whether each application supports multi-touch events. The value of the relevant flag is updated to 1 upon reception of a multi-touch request from an application. More specifically, the multi-touch flag set to 1 indicates that the application is the new application 308 supporting multi-touch events. The multi-touch flag can be changed to 0 by an application by issuing a multi-touch release request to the event distribution unit 306. The default value of the multi-touch flag is 0. With an application that has not issued a multi-touch request to the event distribution unit 306, the multi-touch flag remains 0. Referring to FIG. 9, since a multi-touch request has been transmitted to the event distribution unit 306 in the initialization processing of the box application, only the multi-touch flag of the box application is 1.

Figure 8:
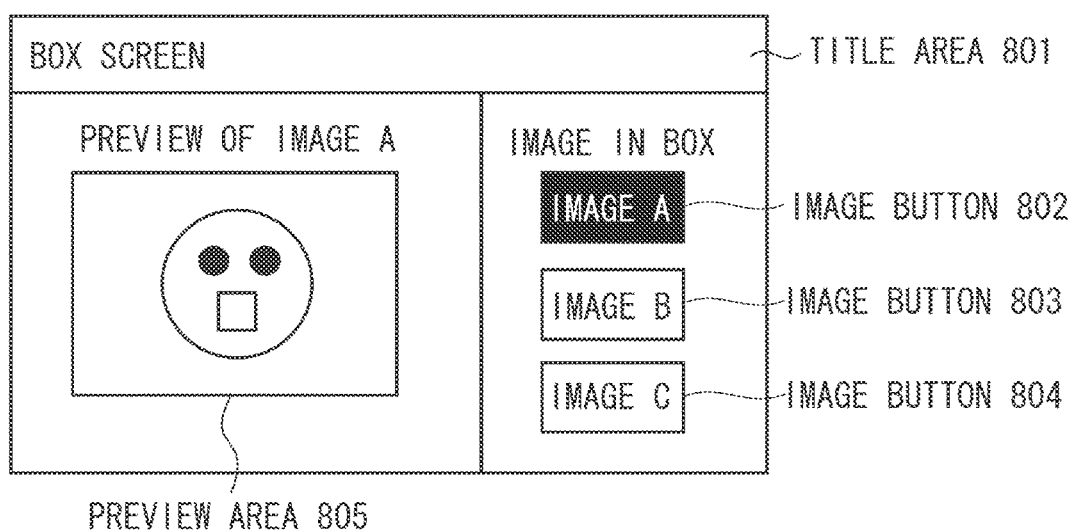
FIG. 8 illustrates an example of a screen displayed on the operation unit of the image forming apparatus.

Upon completion of the initialization processing, the box application displays the screen illustrated in FIG. 8 on the operation unit 106. The screen illustrated in FIG. 8 displays Image buttons 802 to 804 for confirming box-related settings and images stored in the box. The screen illustrated in FIG. 8 will be described below. A title area 801 displays the title name of an application. The Image buttons 802 to 804 are used to select each image stored in the box. When the user touches each button, a preview screen for the image corresponding to the selected button is displayed in a preview display area 805. The selected Image button changes in color to indicate that it is currently selected. Referring to FIG. 8, the Image button 802 is selected, and an Image A is displayed in the preview display area 805.

Processing performed when the user touches the Image button 803 with one finger (single touch) in a Box Screen illustrated in FIG. 8 will be described below. In step S601, when the user performs a single touch operation, the driver unit 301 detects a touch event (touch count=1, event type=single press, and touch coordinates=(300, 100)). The driver unit 301 transmits this touch event to the event management unit 302. Since the touch count of the received touch event is 1, the event management unit 302 determines that the received event is a single touch event (YES in step S602). Then, in step S603, the event management unit 302 transmits the received touch event to the single event notification unit 304. The single event notification unit 304 transmits the event received from the event management unit 302 to the event distribution unit 306. The event distribution unit 306 transmits the event to the box application currently displayed on the operation unit 106. Accordingly, the box application performs an operation corresponding to the received touch event, more specifically, an operation for displaying a preview image of an Image B corresponding to the Image button 803 in the preview display area 805.

Processing performed when the user performs a pinch out operation with two fingers to enlarge the image currently displayed on the preview display area 805 in the Box Screen illustrated in FIG. 8. A pinch out refers to an operation for enlarging an operation target displayed on the touch panel with two fingers. This operation enables intuitively enlarging the operation target.

In step S601, when the user performs a multi-touch operation, the driver unit 301 detects a touch event (touch count=2, event type=multi-press, and touch coordinates= (100, 300), (200, 100)). Then, the driver unit 301 transmits this touch event to the event management unit 302. Since the touch count of the received touch event is 2, the event management unit 302 determines that the received event is a multi-touch event (NO in step S602).

In step S604, the event management unit 302 transmits the received event to the event generation unit 303, and the event generation unit 303 generates a dummy event which is a single touch event. In this case, a dummy event (touch count=1, event type=single press, and touch coordinates= (100, 300)) is generated. Then, the event management unit 302 receives the dummy event from the event generation unit 303, transmits the dummy event to the single event notification unit 304, and, at the same time, transmits an original event received from the driver unit 301 to the multi-event notification unit 305.

The single event notification unit 304 and the multi-event notification unit 305 transmit the received events respectively to the event distribution unit 306. In step S605, upon reception of these events, the event distribution unit 306 determines whether the application currently displayed on the operation unit 106 is an application supporting multi-touch events. The event distribution unit 306 performs the relevant determination by using the multi-touch management table illustrated in FIG. 9. Since the box application is operating on the operation unit 106 and the multi-touch flag of the application in the multi-touch management table is 1, the new application 308 supporting multi-touch events is determined to be currently displayed (YES in step S605). Accordingly, in step S606, the event distribution unit 306 transmits the received dummy and original events to the box application. When the box application receives both the original and the dummy events, it performs an operation corresponding to the original event without using the dummy event. More specifically, the box application interprets the original event and enlarges the image in the preview area.

This completes descriptions of example processing performed when the user performs a single touch and a multi-touch operations by using the new application 308 supporting multi-touch events.

Example processing performed when the user performs a single touch and a multi-touch operations in a state where the copy application (conventional application 307) is displayed on the operation unit 106 will be described below.

When the user touches the Copy button 701 in the initial screen, the copy application corresponding to this button is called and the initialization processing of the copy application is performed. Upon completion of the initialization processing, a Copy Screen illustrated in FIG. 10 is displayed. As described above, in the initialization processing, an application supporting multi-touch events transmits a multi-touch request to the event distribution unit 306. However, since the copy application is the conventional application 307 not supporting multi-touch events, it does not transmit a multi-touch request to the event distribution unit 306 in the initialization processing. Therefore, the multi-touch flag of the copy application in the multi-touch management table illustrated in FIG. 9 remains 0.

The screen illustrated in FIG. 10 will be described below. The screen illustrated in FIG. 10 displays buttons for making copy settings and areas for displaying the current settings. A title area 1001 displays a title name of an application, and a message area 1002 displays a message to the user. A setting check area 1003 displays a currently set printing magnification and a paper size, and a copy count area 1004 displays the currently set number of copies. A Magnification setting button 1005 is used to set a printing magnification. When the user touches this button, a screen for setting a printing magnification is displayed on the operation unit 106. A Paper Selection button 1006 is used to set a paper size to be copied. When the user touches this button, a screen for selecting a paper size is displayed on the operation unit 106. An Advanced Mode button 1007 is used to make copy settings other than the magnification and paper size. When the user touches this button, a screen for making various settings is displayed on the operation unit 106.

Processing performed when the user touches the Paper Selection button 1006 with one finger in the Copy Screen illustrated in FIG. 10. In step S601, when the user performs a single touch operation, the driver unit 301 detects a touch event (touch count=1, event type=single press, and touch coordinates=(200, 200)). Then, the driver unit 301 transmits the detected touch event to the event management unit 302. Since the touch count of the received touch event is 1, the event management unit 302 determines that the received event is a single touch event (YES in step S602). Then, in step S603, the event management unit 302 transmits the touch event to the single event notification unit 304, and the single event notification unit 304 transmits the event to the event distribution unit 306. The event distribution unit 306 transmits the event to the copy application currently displayed on the operation unit 106. Thus, the copy application performs an operation corresponding to the received touch event, more specifically, the copy application displays a screen for selecting paper corresponding to the Paper Selection button 1006.

Processing performed when the user touches the Paper Selection button 1006 with two fingers in the Copy Screen will be described below. In step S601, when the user performs a multi-touch operation, the driver unit 301 detects a touch event (touch count=2, event type=multi-press, and touch coordinates=(200, 200), (210, 200)). The driver unit 301 transmits this touch event to the event management unit 302. Since the touch count of the received touch event is 2, the event management unit 302 determines that the received event is a multi-touch event (NO in step S602). Then, in step S604, the event management unit 302 transmits the received event to the event generation unit 303, and the event generation unit 303 generates a dummy event based on the event. In this case, a single touch event (touch count=1, event type=single press, and touch coordinates=(200, 200)) is generated.

Then, the event management unit 302 transmits the generated dummy event to the single event notification unit 304, and, at the same time, transmits an original event received from the driver unit 301 to the multi-event notification unit 305. The single event notification unit 304 and the multi-event notification unit 305 transmit the received events respectively to the event distribution unit 306.

In step S605, upon reception of these events, the event distribution unit 306 determines whether the application currently displayed on the operation unit 106 is an application supporting multi-touch events. The event distribution unit 306 performs the relevant determination by using the multi-touch management table illustrated in FIG. 9. In this case, since the copy application is operating on the operation unit 106 and the multi-touch flag of the copy application in the multi-touch management table is 0, the event distribution unit 306 determines that the conventional application 307 not supporting multi-touch events is currently displayed. In step S606, therefore, the event distribution unit 306 transmits only the received dummy event to the copy application. Upon reception of the event, the copy application performs an operation corresponding to the received event, more specifically, the copy application displays a screen for selecting paper corresponding to the Paper Selection button 1006.

This completes descriptions of example processing performed when the user performs a single touch and a multi-touch operations by using the conventional application 307 not supporting multi-touch events.

As described above, when the event generated based on a user's touch operation on the touch panel 203 is a multi-touch event, a single touch event generated based on the multi-touch event is transmitted to the conventional application 307 not supporting multi-touch events. Thus, it becomes possible, without modifying the conventional application 307, to maintain operabilities on a conventional touch panel not capable of detecting multi-touch operations.

Figure 6:
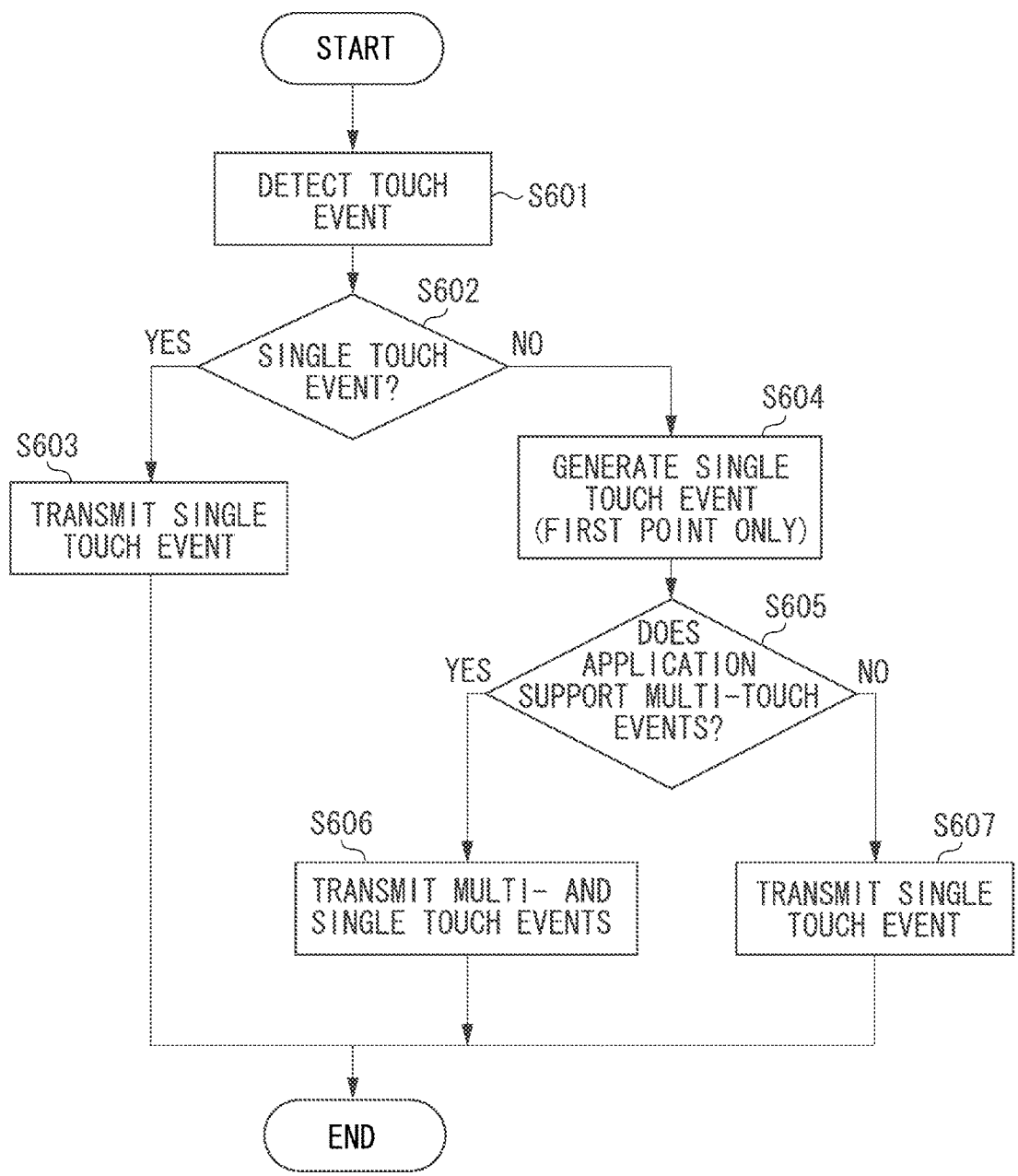
FIG. 6 is a flowchart illustrating processing of a software module according to a first exemplary embodiment of the present disclosure.

Although, in the above descriptions, the coordinates of the first point of a multi-touch event are used as touch coordinates of a single touch event generated in step S604 illustrated in FIG. 6, the coordinates of the middle point between two points of a multi-touch event may be used as touch coordinates. For example, when generating a single touch event based on a multi-touch event with the event ID 1 illustrated in FIG. 5, the touch coordinates of a single touch event to be generated may be (205, 200). This enables transmitting to an application a single touch event having the same coordinates as the coordinates detected on a conventional resistance film type (pressure-sensitive type) touch panel, and offering an environment providing higher compatibility.

In the above descriptions, in step S606 illustrated in FIG. 6, the event distribution unit 306 transmits both a multi-touch and a single touch events to the new application 308. More specifically, regardless of whether the single touch event received from the single event notification unit 304 is an original or a dummy event, the event distribution unit 306 transmits the event to the new application 308. This is because the event distribution unit 306 is unable to identify whether the received single touch event is an original or a dummy event. If the event distribution unit 306 is able to identify whether the event is an original or a dummy event, the event distribution unit 306 does not need to transmit a dummy event to the new application 308. Then, when transmitting a dummy event to the single event notification unit 304, the event management unit 302 may include information for allowing the event distribution unit 306 to identify a dummy event in the dummy event. The event distribution unit 306 determines whether the received single touch event is a dummy event based on the information. When the received event is determined to be a dummy event, the event distribution unit 306 performs control not to transmit the event to the new application 308 but to transmit it only to the conventional application 307. This enables not only facilitating the implementation of applications but also reducing the amount of event transmission to alleviate loads on the entire system.

In the above-described first exemplary embodiment, when a multi-touch event is detected in the driver unit 301, a dummy event is generated regardless of whether the conventional application 307 or the new application 308 is currently displayed on the operation unit 106. This is because the event distribution unit 306 manages information about whether the application currently displayed on the operation unit 106 supports multi-touch events, and therefore the event management unit 302 is unable to determine whether the application supports multi-touch events. However, the event distribution unit 306 may notify the event management unit 302 of information about which application is currently displayed on the operation unit 106, and the event management unit 302 may determine whether the application currently displayed on the operation unit 106 supports multi-touch events. When the new application 308 is displayed, it is also possible not to generate or transmit a dummy event even if a multi-touch event is detected. Processing in this case will be described below, as a second exemplary embodiment, with reference to a flowchart illustrated in FIG. 11. Processing identical to that illustrated in FIG. 6 is assigned the same reference numeral, and the detailed descriptions thereof will be omitted.

When the event management unit 302 determines that the received event is a multi-touch event (NO in step S602), then in step S605, the event management unit 302 determines whether the application currently displayed on the LCD 206 is an application supporting multi-touch events. More specifically, the event management unit 302 determines whether the operation target application is an application supporting multi-touch events by making an inquiry to the event distribution unit 306 via the single event notification unit 304. Further, the event distribution unit 306 may periodically notify the event management unit 302 of application information, and the event management unit 302 may perform the determination based on the relevant information.

When the event management unit 302 determines that the application currently displayed on the LCD 206 is the new application 308 supporting multi-touch events (YES in step S605), then in step S1101, the event management unit 302 transmits the multi-touch event received from the driver unit 301 to the multi-event notification unit 305. The multi-event notification unit 305 transmits the multi-touch event to the event distribution unit 306. The event distribution unit 306 transmits the multi-touch event to the new application 308.

On the other hand, when the event management unit 302 determines that the application currently displayed on the LCD 206 is the conventional application 307 not supporting multi-touch events (NO in step S605), the event management unit 302 transmits the received multi-touch event to the event generation unit 303. Then in step S604, the event generation unit 303 generates a single touch event as a dummy event based on the received multi-touch event. In step S607, the event generation unit 303 transmits the generated single touch event to the event management unit 302. The event management unit 302 transmits the single touch event to the single event notification unit 304. The single event notification unit 304 transmits the single touch event to the event distribution unit 306. The event distribution unit 306 transmits the received single touch event to the conventional application 307.

As described above, according to the second exemplary embodiment, the event management unit 302 determines whether the current operation target application is an application supporting multi-touch events, and generates a dummy event, only when the application is an application not supporting multi-touch events. This eliminates the need of performing unnecessary dummy event generation processing and hence reduces the number of events to be transmitted to the event distribution unit 306 via the single event notification unit 304, thus alleviating loads on the entire system.

In the first and the second exemplary embodiments, when the user performs a single touch operation on the touch panel 203, only a single touch event is transmitted to the new application 308 (in step S603 of the respective flowcharts illustrated in FIGS. 6 and 11). A single touch and a multi-touch events are transmitted via different event transmission paths (via the single event notification unit 304 and the multi-event notification unit 305, respectively). Therefore, even if the user performs a multi-touch and a single touch operations in this order, the relevant events may not reach the application in this order.

For example, it is assumed that, in the Box screen illustrated in FIG. 8, the user performs a touch (single touch) operation for selecting the Image button 803 and then performs a pinch out (multi-touch) operation for enlarging the preview image of the Image B. In this case, if the single event notification unit 304 is unable to immediately operate because of other processing, a multi-touch event transmitted via the multi-event notification unit 305 may reach the new application 308 first. As a result, the box application first performs processing corresponding to the multi-touch event, and then performs processing corresponding to the single touch event. More specifically, the preview image of the currently displayed Image A is enlarged first, and then the preview image of the Image B is displayed. Thus, an operation result intended by the user is not obtained.

A method for transmitting events to the new application 308 in the same order of user's touch operations according to a third exemplary embodiment will be described below with reference to a flowchart illustrated in FIG. 12. Basic processing and control are similar to those according to the first and the second exemplary embodiments, and therefore the third exemplary embodiment will be described below focusing on differences from the first and the second exemplary embodiments. Referring to the flowchart illustrated in FIG. 12, processing in steps S601 to S607 is similar to processing in the same steps in the flowchart illustrated in FIG. 6. The flowchart illustrated in FIG. 12 differs from the flowchart illustrated in FIG. 6 in the processing in step S602 performed when the event received from the driver unit 301 is determined to be a single touch event (YES in step S602).

When the event management unit 302 determines that an event received from the driver unit 301 is a single touch event (YES in step S602), then in step S1201, the event management unit 302 determines whether the application currently displayed on the LCD 206 is the new application 308 supporting multi-touch events. This determination method will be described below. First of all, upon reception of the event from the driver unit 301, the event management unit 302 makes an inquiry about information of the application currently displayed on the operation unit 106 to the event distribution unit 306 via the single event notification unit 304. Then, based on the information returned from the event distribution unit 306, the event management unit 302 determines whether the application currently displayed on the LCD 206 is an application supporting multi-touch events.

When the event management unit 302 determines that the application currently displayed on the LCD 206 is the conventional application 307 (NO in step S1201), then in step S603, the event management unit 302 transmits the received event to the single event notification unit 304 similar to the first exemplary embodiment. The single event notification unit 304 transmits the event to the conventional application 307 via the event distribution unit 306.

On the other hand, when the event management unit 302 determines that the application currently displayed on the LCD 206 is the new application 308 (YES in step S1201), the event management unit 302 transmits the single touch event received from the driver unit 301 to the event generation unit 303. Then, in step S1202, the event generation unit 303 generates a multi-touch event based on the received single touch event. In this case, it is assumed that touch coordinates of the first point of the generated multi-touch event are the same as coordinates included in the single touch event, and touch coordinates of the second point are to be fixed to coordinates (0, 0). For example, when a single touch event with the event ID 1 illustrated in FIG. 4 is received, the event generation unit 303 generates a multi-touch event (touch count=2, event type=multi-press, and touch coordinates=(200, 200), (0, 0)). Hereinafter, a multi-touch event generated by the event generation unit 303 is referred to as a dummy event, and a single touch event received from the driver unit 301 is referred to as an original event. The event generation unit 303 transmits the generated dummy event to the event management unit 302.

The event management unit 302 transmits the dummy event (multi-touch event) transmitted from the event generation unit 303 to the multi-event notification unit 305. The event management unit 302 further transmits the original event (single touch event) received from the driver unit 301 to the single event notification unit 304.

The single event notification unit 304 and the multi-event notification unit 305 respectively transmit the received events to the event distribution unit 306. In step S1203, the event distribution unit 306 transmits the received dummy and original events to the new application 308.

As described above, when the user performs a single touch operation when the new application 308 is currently displayed on the LCD 206, a multi-touch event generated as a dummy event is transmitted to the new application 308 together with a single touch event. This enables a multi-touch event to be constantly transmitted to the new application 308 regardless of whether the user performs a single touch or a multi-touch operation on the touch panel 203. The new application 308 checks the coordinates of the second point of the received multi-touch event. When the coordinates of the second point are coordinates (0, 0), the new application 308 interprets the received event as a single touch event. On the other hand, when the coordinates of the second point are not coordinates (0, 0), the new application 308 interprets the received event as a multi-touch event. When the new application 308 interprets the received event as a single touch event, it performs an operation corresponding to the single touch event based on the coordinates of the first point.

According to the present exemplary embodiment, when the current operation target application is the new application 308, a multi-touch event is transmitted regardless of whether the user performs a single touch or a multi-touch operation. Then, the new application 308 ignores the single touch event and performs an operation based on the received multi-touch event, enabling performing correct operations in the same order as the order of user operations.

In the above-described present exemplary embodiment, when the received event is determined to be not a single touch event (NO in step S602), then in step S604, the event management unit 302 determines whether the application currently displayed on the LCD 206 is the new application 308 supporting multi-touch events, and generates a dummy event when the application is determined to be the new application 308. However, when the received event is determined to be not a single touch event (NO in step S602), the event generation unit 303 may always generate a dummy event. In this case, the dummy event generated by the event generation unit 303 is transmitted to the event distribution unit 306 via the multi-event notification unit 305. Then, the event distribution unit 306 determines whether the application currently displayed on the LCD 206 supports multi-touch events. When the application supports multi-touch events, the event distribution unit 306 transmits a dummy and an original events to the application. On the other hand, when the application does not support multi-touch events, the event distribution unit 306 transmits only an original event to the application. This enables acquiring similar effects without determination by the event management unit 302 as to whether the current operation target application supports multi-touch events.

Although, in the above-described exemplary embodiments, a touch event detected by the driver unit 301 includes the touch count, the event type, and the touch coordinates, a touch event is not limited thereto. For example, the touch count may be omitted as information included in the touch event. Further, since it is possible to determine a single touch or a multi-touch event based on the touch count, the event type may not include information about a single touch or a multi-touch event but include only "press", "move", or "release." Furthermore, one event may include only one touch coordinates, instead of including a plurality of touch coordinates in one touch event, and a plurality of touch events may be transmitted. Modifying a touch event according to a system configuration enables not only facilitating the implementation of applications but also reducing the amount of event transmission to alleviate loads on the entire system.

Although, in the above-described exemplary embodiments, the image forming apparatus 100 has a plurality of functions such as a copy function, a scanner function, and a print function, the present invention is also applicable to an image processing apparatus having only a part of these functions. The present invention may also be applied to a personal computer, a personal digital assistant (PDA), a mobile phone, a facsimile, a camera, a video camera, an image viewer, and other information processing apparatuses.

As described above, according to the above-described exemplary embodiments, conventional operabilities can be maintained even in a case where an application not supporting multi-touch events is operated on an information processing apparatus having a touch panel capable of detecting multi-touch operations.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), or the like, and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-246336, filed Dec. 4, 2014, which is hereby incorporated by reference herein in its entirety.

What is claimed is:

1. An information processing apparatus having a touch panel capable of detecting multi-touch operations, the information processing apparatus comprising:
   one or more memories storing instructions; and
   one or more processors which, when executing the instructions, causes the information processing apparatus to perform:
   detecting a touch event based on an operation by a user on the touch panel;
   determining, in a case where the detected touch event is a multi-touch event including touch positions of two points, whether an operator target application supports multi-touch events;
   generating, in a case where it is determined that the operation target application does not support the multi-touch events, a single touch event including a touch position of one point based on the detected multi-touch event; and
   transmitting the generated single touch event to the operation target application not supporting multi-touch events.

2. The information processing apparatus according to claim 1, wherein the transmitting does not transmit the detected multi-touch event but transmits the generated single touch event to the operation target application not supporting multi-touch events.

3. The information processing apparatus according to claim 1, wherein the generating generates, in a case where it is determined that the operation target application supports the multi-touch events, the detected multi-touch event and the generated single touch event, and
   the transmitting transmits the detected multi-touch event and the generated single touch event to an application supporting multi-touch events.

4. The information processing apparatus according to claim 1, wherein the generating generates, in a case where the detected touch event is the single touch event, a multi-touch event based on the detected single touch event, and
   wherein the transmitting transmits the detected single touch event and the generated multi-touch event to the operation target application supporting multi-touch events.

5. The information processing apparatus according to claim 1, wherein the information processing apparatus further performs:
   managing information about whether each of a plurality of applications supports multi-touch events,
   whether the determining determines whether the operation target application supports the multi-touch events based on the managed information.

6. The information processing apparatus according to claim 5, wherein the managing updates managed information based on information notified from each application in initialization processing of each of the plurality of applications.

7. The information processing apparatus according to claim 1, wherein the detected touch event includes a touch count and an event type.

8. The information processing apparatus according to claim 7, wherein the generating generates a single touch event which includes either one of the touch positions of the two points included in the detected multi-touch event.

9. The information processing apparatus according to claim 1, wherein the information processing apparatus further performs reading an image.

10. The information processing apparatus according to claim 1, wherein the information processing apparatus further performs printing an image.

11. The information processing apparatus according to claim 1, wherein the generating determines a touch position of one point based on both of the touch positions of the two points included in the detected multi-touch event, and generates a single touch event including the determined touch position of the one point.

12. The information processing apparatus according to claim 11, wherein the generating generates a single touch event including, as a touch position, a center between the touch positions of the two points included in the detected multi-touch event.

13. An information processing method in an information processing apparatus having a touch panel capable of detecting multi-touch operations, the information processing method comprising:
   detecting a touch event including a touch position based on an operation by a user on the touch panel;
   determining, in a case where the detected touch event is a multi-touch event including touch positions of two points, whether an operator target application supports multi-touch events;
   generating, in a case where it is determined that the operation target application does not support the multi-touch events, a single touch event including a touch position of one point based on the detected multi-touch event; and
   transmitting the generated single touch event to the operation target application not supporting multi-touch events.

14. A non-transitory computer-readable storage medium storing a program for causing a computer to execute an information processing method in an information processing apparatus having a touch panel capable of detecting multi-touch operations, the information processing method comprising:
   detecting a touch event including a touch position based on an operation by a user on the touch panel;
   determining, in a case where the detected touch event is a multi-touch event including touch positions of two points, whether an operator target application supports multi-touch events;
   generating, in a case where it is determined that the operation target application does not support the multi-touch events, a single touch event including touch positions of one point based on the detected multi-touch event; and
   transmitting the generated single touch event to an to the operation target application not supporting multi-touch events.

* * * * *